United States Patent
Luo et al.

(10) Patent No.: US 6,400,457 B2
(45) Date of Patent: *Jun. 4, 2002

(54) FERROFLUID 3-D GYROSCOPE AND LIGHT MODULATOR

(75) Inventors: Weili Luo, Oviedo; Tengda Du, Orlando, both of FL (US); Jie Huang, East Lansing, MI (US)

(73) Assignee: University of Central Florida, Orlando, FL (US)

( * ) Notice: Subject to any disclaimer, the term of this patent is extended or adjusted under 35 U.S.C. 154(b) by 0 days.

This patent is subject to a terminal disclaimer.

(21) Appl. No.: 09/861,432

(22) Filed: May 18, 2001

Related U.S. Application Data

(62) Division of application No. 09/454,473, filed on Dec. 3, 1999, now Pat. No. 6,266,146.

(51) Int. Cl.[7] .................................................. G01B 9/02
(52) U.S. Cl. ....................................... 356/459; 356/521
(58) Field of Search ................................ 356/450, 459, 356/521; 73/1.38, 1.14; 250/231.12

(56) References Cited

U.S. PATENT DOCUMENTS

| | | |
|---|---|---|
| 3,354,311 A | 11/1967 | Vali et al. |
| 3,639,063 A | 2/1972 | Krogstad et al. |
| 3,930,729 A | 1/1976 | Gunn |
| 4,011,044 A | 3/1977 | Uzgiris |
| 4,086,808 A | 5/1978 | Camac et al. |
| 4,656,421 A | 4/1987 | Ellis et al. |
| 4,706,498 A | 11/1987 | Nemnich et al. |
| 5,064,288 A | 11/1991 | Dyes et al. |
| 5,555,086 A | 9/1996 | vonBieren et al. |
| 5,621,525 A | 4/1997 | Vogeler et al. |
| 5,680,213 A | 10/1997 | Hunsaker et al. |

OTHER PUBLICATIONS

Tengda Du, Thermal Lens Coupled Magneto–Optical Effect in a Ferrofluid, *Physical Review Letters*, V 77, No. 2, p 390–393, Jul. 8, 1996.

Tengda Du Dynamic Interference Patterns from Ferrofluids, *Modern Physics Letters*, V 9, No. 25, p. 1643–1647, Oct. 18, 1995.

Jinlong Zhang, Two Mechanisms and a Scaling Relation for Dynamics in Ferrofluids, *Physical Review Letters*, V. 77, No. 2, p. 390–393, Feb. 1, 1995.

Tengda Du, Nonlinear Optical Effects in Ferrofluids Induced by Temperature and Concentrarion Cross Coupling, *American Institute of Physics*, Department of Physics, UCF, EDU, Nov. 18, 1997.

*Primary Examiner*—Samuel A. Turner
(74) *Attorney, Agent, or Firm*—Law Offices of Brian S. Steinberger, PA; Brian S. Steinberger

(57) ABSTRACT

Apparatus and methods for passing a focused laser beam through a thin ferrofluid cell creates a spatial distribution in the refractive index of the ferrofluid and generates a diffraction ring patterns. Using a pair of perpendicularly placed ferrofluid cells, two sets of diffraction ring patterns can be produced on two viewing screens. Deformations in the diffraction patterns due to an acceleration can be viewed on the screens, providing a ferrofluid accelerometer. By applying an electric or a magnetic field on a thin ferrofluid sample, the light passing through the sample can be modulated by the field, providing a light modulator. The apparatus and method has applications for detecting acceleration information within a gyroscope and for use in toys.

16 Claims, 7 Drawing Sheets

FERROFLUID 3-D GYROSCOPE AND LIGHT MODULATOR

This is a Divisional of application Ser. No. 09/454,473 filed Dec. 3, 1999 U.S. Pat. No. 6,266,146.

This invention relates to three-dimensional (3-D) acceleration detection and light modulation, and in specific to using two perpendicular laser beams focused on two ferrofluid cells to create two diffraction patterns whose deformations due to accelerations are used to visually display and detect the accelerations, and also using an electric or a magnetic field to modulate the intensity of light.

BACKGROUND AND PRIOR ART

Laser produced interference fringes from mechanical type mediums have been previously detected in order to extrapolate movement detection. See for example, U.S. Pat. No. 3,354,311 to Vali et al.; U.S. Pat. No. 3,639,063 to Krogstad et al.; and U.S. Pat. No. 4,086,808 to Camac.

Laser produced interference fringe patterns have also been observed through ferrofluids by two of the co-inventors of the subject invention. See for example. Du et al. "Thermal Lens coupled magneto-optical Effect in a Ferrfluid", Applied Physics Letters 65(14). Oct. 3, 1994, pp 1844–1846; Du et al. "Dynamic Interference Patterns From Ferrofluids", Modern Physics Letters 3, Vol. 9, No. 25(1995), pp.1643–1647; Zhang et al. "Two Mechanisms and a Scaling Relation for Dynamics in Ferrofluids", Physical Review Letters Vol. 77, No. 2, July 1996, pp. 390–393: and Du et al. "Nonlinear Optical Effects in Ferrofluids Induced by Temperature and Concentration Cross-Coupling", Applied Phys. Letters 72(3), January 1998, pp 272–274.

Interference fringe rings have been created by passing laser beams through liquid crystals in order to measure the power density of the laser beam. See U.S. Pat. No. 5,621,525 to Vogeler et al., which is assigned to the University of Central Florida, the assignee of the subject invention.

However, the cited art are generally limited to detection of fringes along a single x and y axis. None of the cited prior art allows for the detection of fringe patterns along all three dimensions(x,y,z) to be useful as gyroscopes and accelerometers.

SUMMARY OF THE INVENTION

A first object of the invention is to provide a simplified, low-cost means of visually displaying accelerations using fringe patterns generated through ferrofluid samples.

A second object of the invention is to provide a method of modulating light intensity with two independent control fields.

The third objective of the invention is to provide a simple technique to display gravity visually through the diffraction patterns generated from the ferrofluids, which could be used by aerospace industries and NASA.

The fourth objective of the invention is to produce educational toys based on the principles discussed in this invention.

This invention relates to three-dimensional (3-D) acceleration detection and light modulation. In specific, the invention uses two perpendicular laser beams focused on two ferrofluid cells to create two diffraction patterns whose deformations due to accelerations are used to visually display and detect the accelerations. The invention also utilizes an electric or a magnetic field to modulate the intensity of light.

In the absence of accelerations, the subject invention demonstrates that a focused laser beam perpendicularly passing through a thin ferrofluid layer can generate concentric diffraction rings. The ferrofluid consists of magnetic particles suspended in kerosene. The strong light absorption of the particles causes nonuniform distributions in both temperature and particle concentration, yielding a spatial distribution in the index of refraction of the fluid around the beam and forming the observed rings. This diffraction pattern is visually observable by placing a viewing screen, which may simply comprise a piece of paper, a suitable distance away from the layer in the forward direction of the beam.

For a fluid with a nonuniform distribution in its mass density, an acceleration might cause a convective fluid flow within the fluid. If this fluid motion yields a measurable result, the result in turn can be used to determine the acceleration, providing a fluid-based accelerometer. The generated diffraction rings can be used to display the effect of an acceleration on the thin ferrofluid layer. The mass density of the fluid around the beam is nonuniform in the radial direction due to the inhomogeneous radial distributions in both temperature and concentration.

Accelerations perpendicular to the layer, do not cause convective motions within the fluid, and the concentric rings remain unchanged. However, an acceleration parallel to the layer causes a convective flow and deforms the rings. These deformed rings are easily visible to the eye, providing a qualitative and convenient means to visually display the acceleration. The measurement of the deformation in the rings can be used to determine the acceleration quantitatively, providing a method to measure accelerations when they are parallel to the layer. Since an acceleration can be decomposed into two accelerations perpendicular to each other and two perpendicularly placed ferrofluid cells can be used to display these two accelerations, an acceleration in any direction can be determined, providing a convenient 3-D ferrofluid accelerometer and gyroscope.

When an electric or a magnetic field is applied to a ferrofluid, the magnetic particles within the fluid have a strong interaction with the field, causing particles to move within the fluid. This interaction can be used to modulate the intensity of light passing through a ferrofluid sample.

Further objects and advantages of this invention will be apparent from the following detailed description of a presently preferred embodiment which is illustrated schematically in the accompanying drawings.

DESCRIPTION OF THE PREFERRED EMBODIMENT

Before explaining the disclosed embodiment of the present invention in detail it is to be understood that the invention is not limited in its application to the details of the particular arrangement shown since the invention is capable of other embodiments. Also, the terminology used herein is for the purpose of description and not of limitation.

Figure 1:
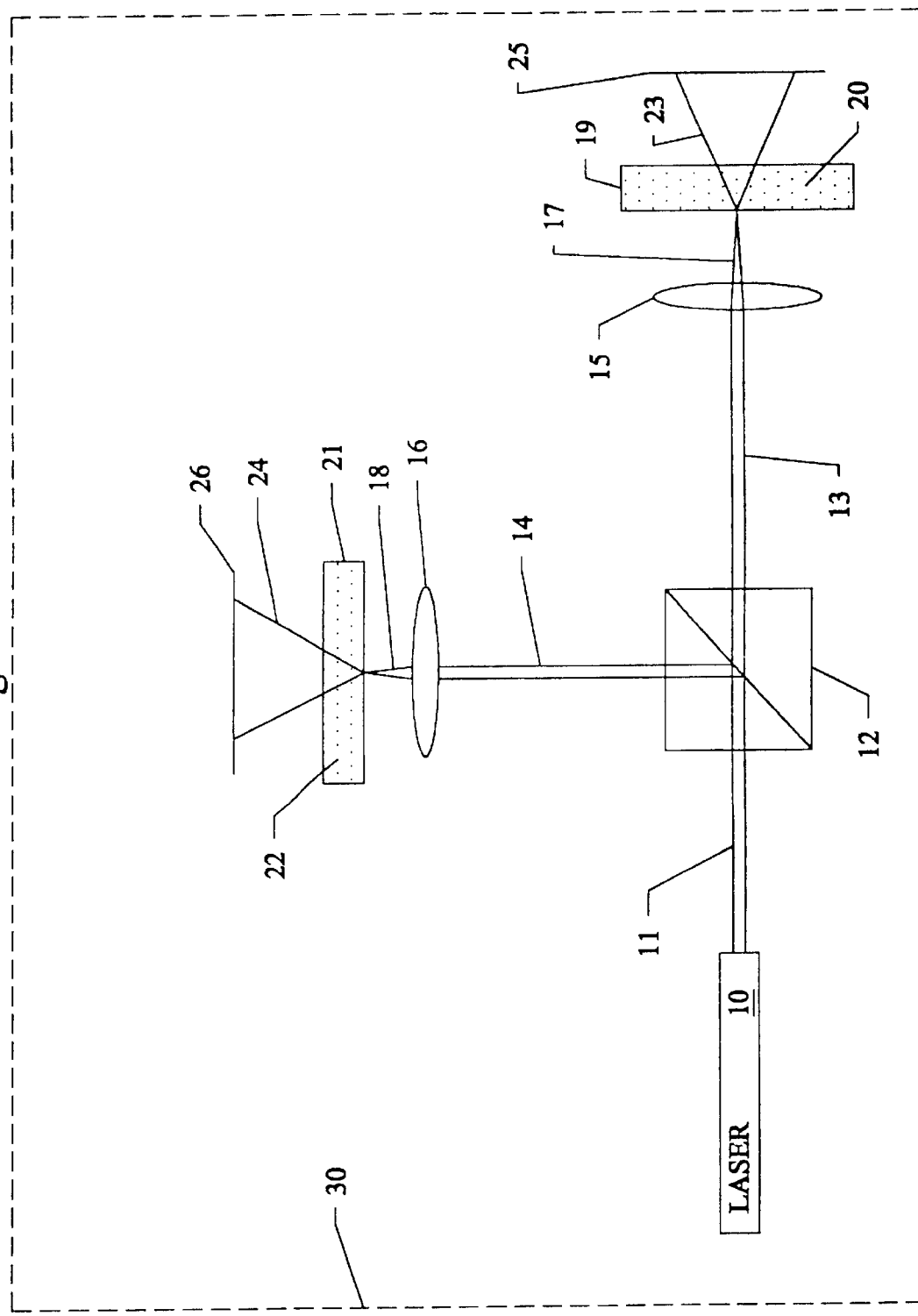
FIG. 1 is a side view schematic illustration of a ferrofluid accelerometer of the invention.
Figure 5:
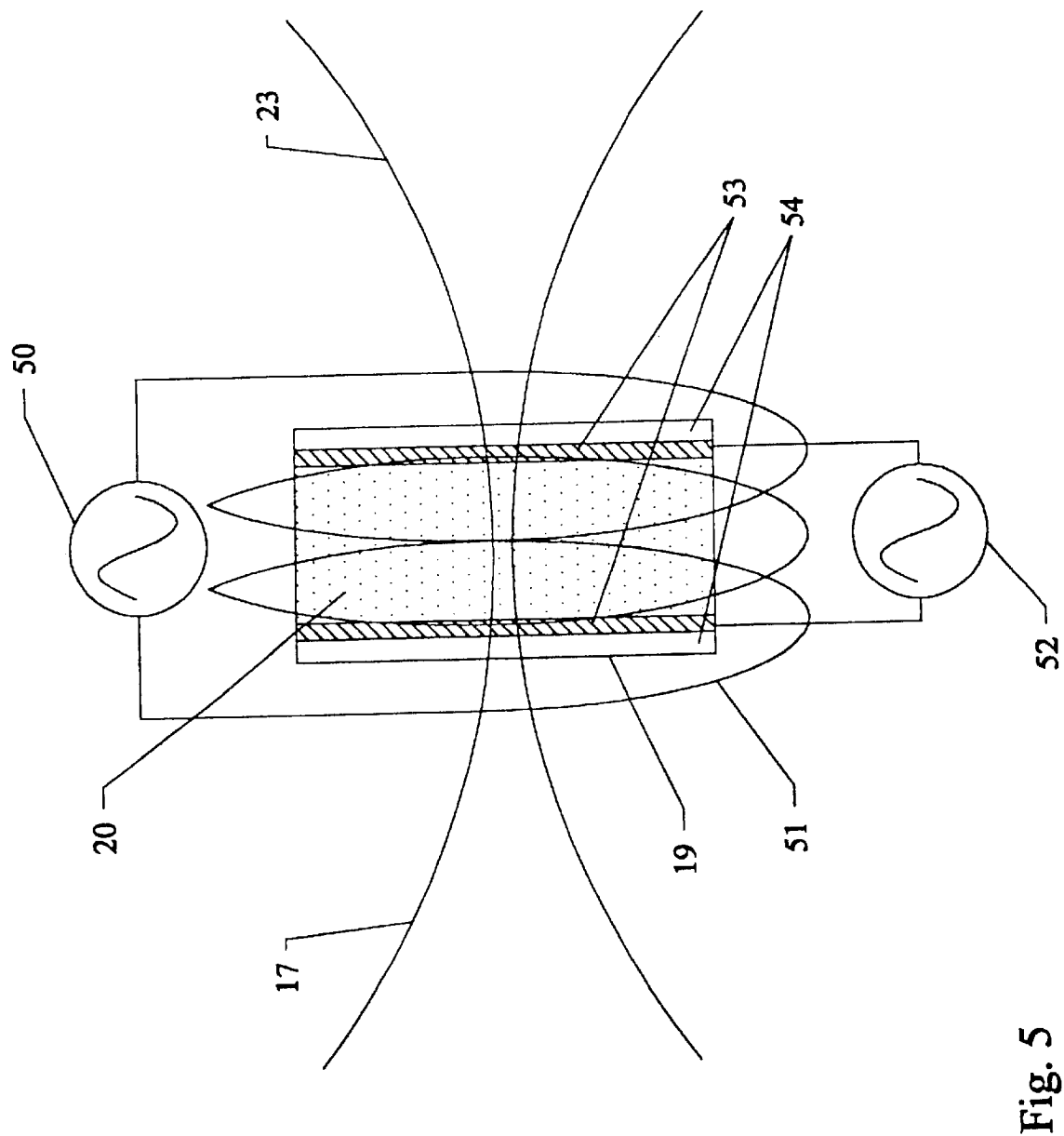
FIG. 5 is a schematic illustration of a ferrofluid light modulator.
Figure 7:
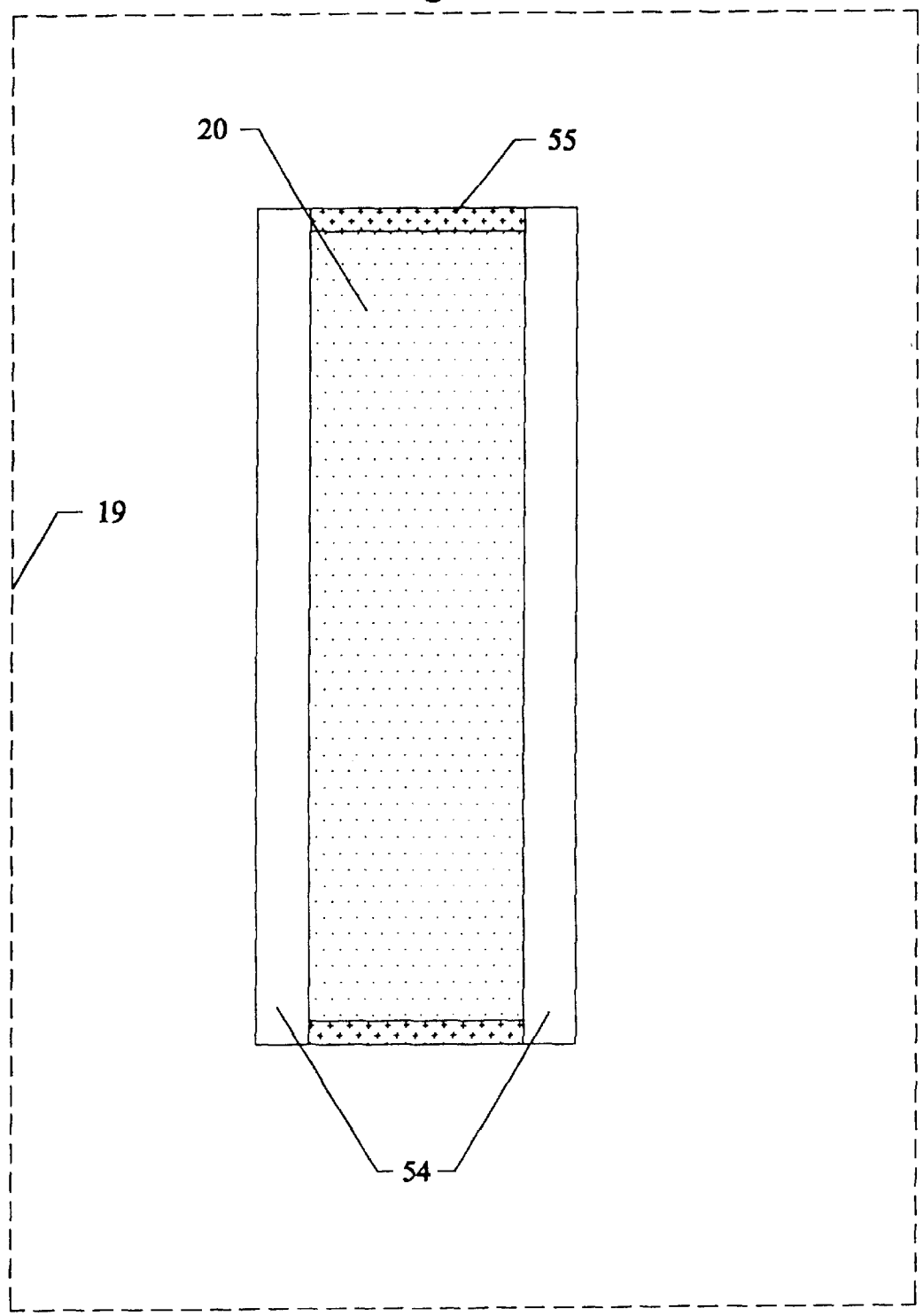
FIG. 7 shows a ferrofluid gyroscope of the invention.

A system for optically detecting accelerations is illustrated in FIG. 1. The system comprises a pair of ferrofluid cells 19 and 21 fabricated of a light-transmissive, fluid-impenetrable material, such as glass, plastic or the like. FIG. 5 shows that the cell 19 can be used as a light modulator. FIG. 7 shows the cell 19 is used in a 3-D gyroscope as a separated cell. When used as a gyroscope. the AC current source 50, AC voltage source 52, Magnetic coil 51 are not used, and the cell is not coated with conducting layers 53.

Referring to FIG. 1, the thickness of each of the cells 19, 20 is approximately 100 $\mu$m and the dimension is 2×2 cm$^2$. They are filled with ferrofluid 20 and 22. The ferrofluid consists of magnetite particles (volume fraction 6%) suspended in kerosene. The mean diameter of each particle is 9 nm and each particle is coated with a non-magnetic surfactant layer(such as oleic acid) of 2 nm in thickness to prevent agglomeration.

FIG. 1 schematically illustrates a ferrofluid accelerometer 30 that includes a laser light source 10 such as a He—Ne laser 10 with a power of 8 mW which produces a beam 11 having a wavelength of approximately 632.8 nm. FIG. 1 further includes a half reflection and half transmission beam splitter 12, a pair of single piece convex lenses 15 and 16, two thin ferrofluid cells 19 and 21, and a pair of viewing screens 25 and 26 with a calibrated scale.

Figure 2:
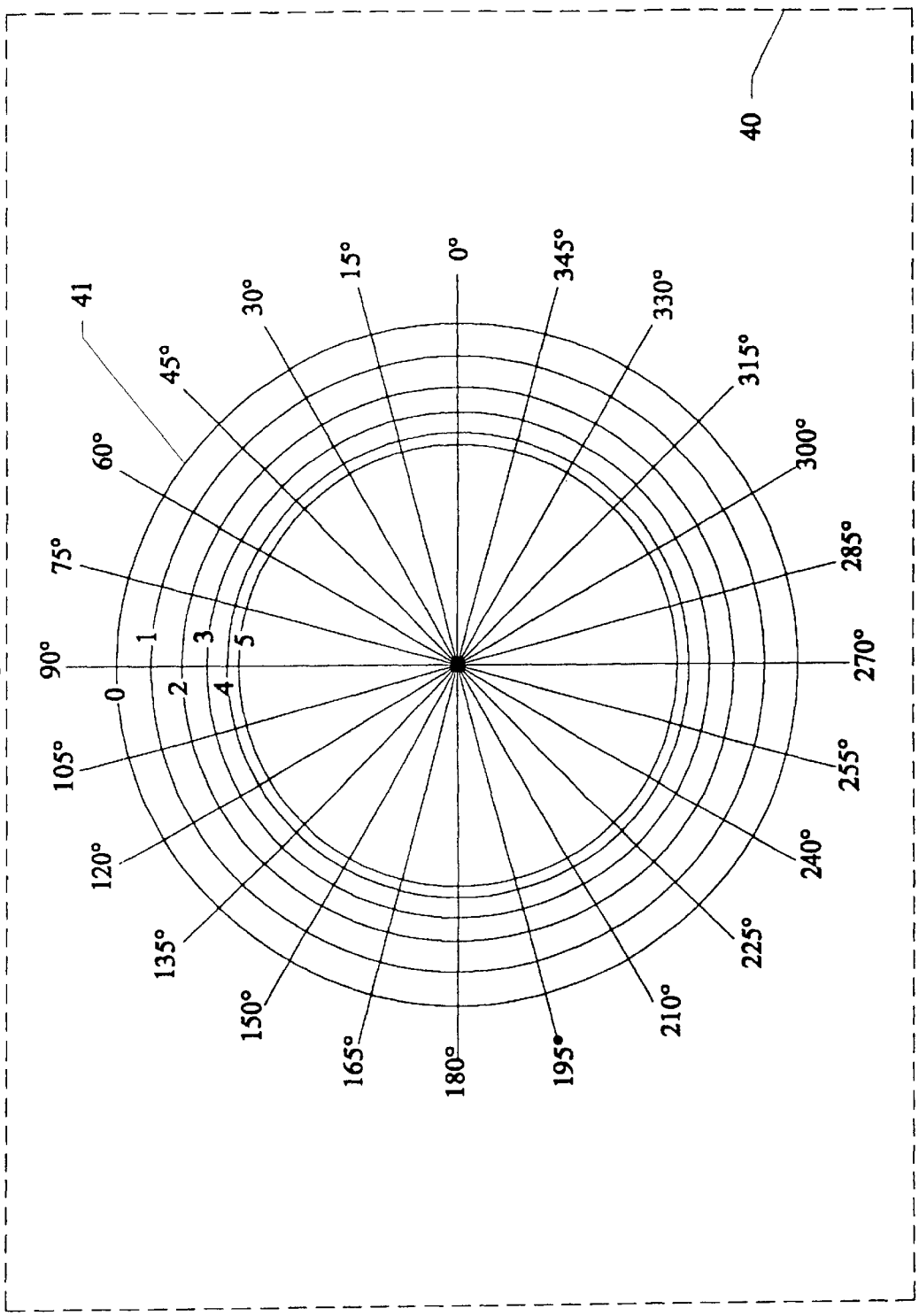
FIG. 2 shows a viewing screen with a calibrated scale shown in the apparatus of FIG. 1.
Figure 3:
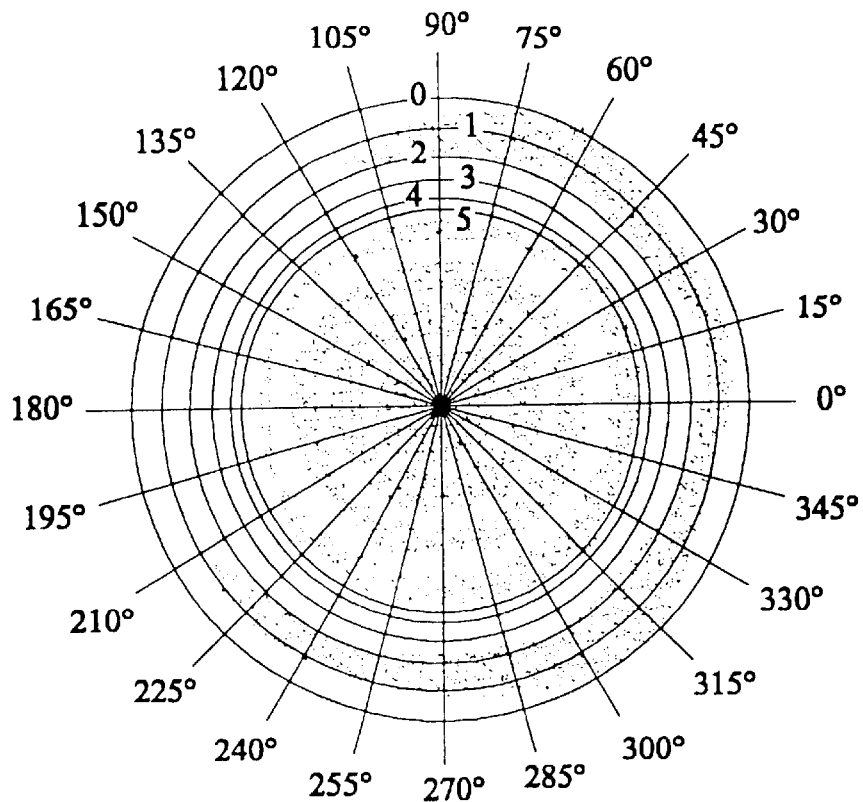
FIG. 3 is the diffraction pattern without accelerations produced on a viewing screen shown in the apparatus of FIG. 1.
Figure 4:
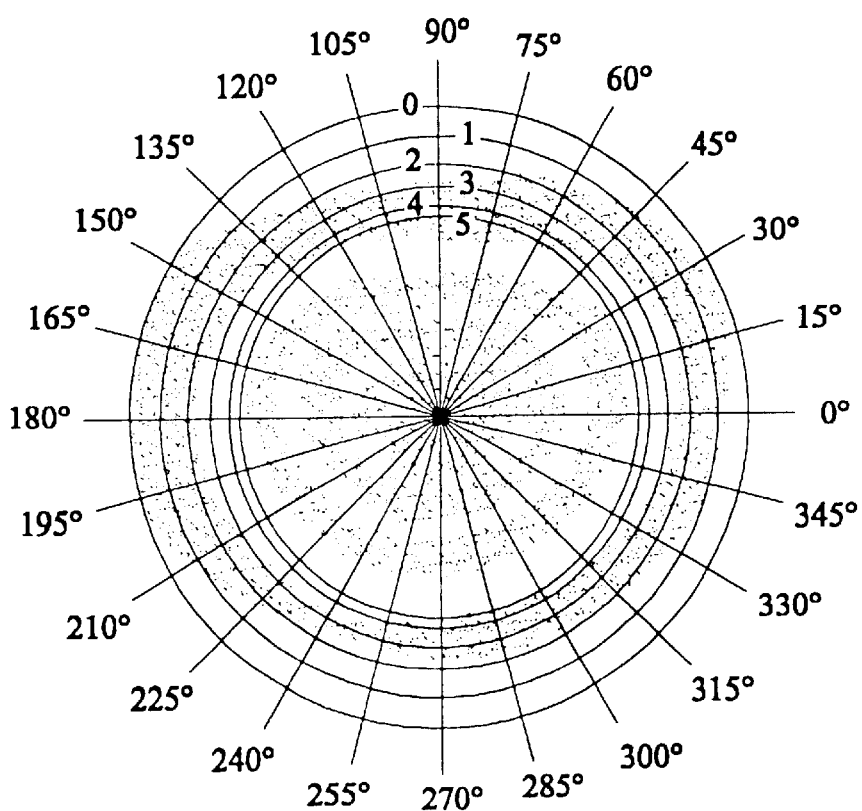
FIG. 4 is the diffraction pattern with an acceleration produced on a viewing screen shown in the apparatus of FIG. 1.

The viewing screen with calibrated scale is shown in FIG. 2. The viewing screen is specifically designed for visual-display purpose instead of using computers. As mentioned in the description of FIG. 2, the concentric circles are the scales for magnitude of accelerations and the radical lines are for their direction. FIG. 3 and FIG. 4 are two examples for measuring accelerations.

Referring to FIG. 1, beam splitter 12 splits beam 11 into two beams, beam 13 and beam 14. Lens 15 focuses beam 13 on ferrofluid cell 19, and lens 16 focuses beam 14 on ferrofluid cell 21. Focused beam 17 creates a spatial distribution in the refractive index of ferrofluid 20 and generates diffraction pattern 23 displayed on viewing screen 25. Similarly, focused beam 18 creates a spatial distribution in the refractive index of ferrofluid 22 and generates diffraction pattern 24 displayed on viewing screen 26. As previously mentioned, acceleration can be determined by viewing the patterns on the calibrated scale 40, and can be done manually or by computer.

FIG. 2 shows a viewing screen 40 with a calibrated scale 41. Scales 41 consists a set of concentric circles corresponding to accelerations 0, 1, 2, 3, 4, and 5 m/s$^2$-calibrated with our experimental data.

FIG. 3 is a photographic reproduction of the diffraction pattern in the absence of accelerations produced on a viewing screen shown in the apparatus of FIG. 1. As can be seen clearly, these diffraction rings are not distorted. The most outside pink ring is chosen as the reference ring.

FIG. 4 is a photographic reproduction of a deformed diffraction pattern due to the effect of an acceleration produced on a viewing screen shown in the apparatus of FIG. 1. Deformation in the diffraction rings is clearly shown. The acceleration is in the direction of 270 degrees and has a magnitude of 5 m/s$^2$.

If there is no acceleration, the diffraction rings are perfect circles as shown in FIG. 3. If there is an acceleration the diffraction pattern will deform. The deformation will occur in the direction of acceleration. Specifically the upper part which is opposite to the direction of acceleration is compressed, and the lower part which is parallel to the direction of acceleration is elongated. Therefore we can determine the direction of acceleration by finding the elongation direction of the pattern. The magnitude of acceleration can be evaluated by observing the reference ring (compressed of outmost ring) which aligns the calibrated scale. FIG. 4 shows the compressed part aligns with a scale circle labeled "5", we say the magnitude of acceleration is 5 m/s$^2$. The elongation direction is in 270 degrees radical direction, so is the direction of the acceleration.

Referring to FIG. 1, screen 25 is an X-Y plane and screen 26 is an Y-Z plane. With the method described above we can separately determine the X components by view screen 25, the Z component by viewing screen 26, and Y component by viewing either screen 25 or screen 26 or taking the average of both. The acceleration in X, Y, Z direction can then be calculated.

FIG. 5 schematically illustrates a light modulator. The ferrofluid cell 19 is modified by coating electrically conducting layers 53 on the inner sides of the two glass plates 54, and an AC voltage source 52 is supplied on the two conducting layers 53. A magnetic coil 51 is connected with an AC current source 50, providing an AC magnetic field on the ferrofluid 20.

The light modulator can be used to modulate a laser with a constant input power to output an ac power with certain frequency. It can use one of the two branches in FIG. 1. The output power can be modulated with a certain frequency, which is doubled from that of magnetic or electric field as shown in FIG. 6.

Figure 6:
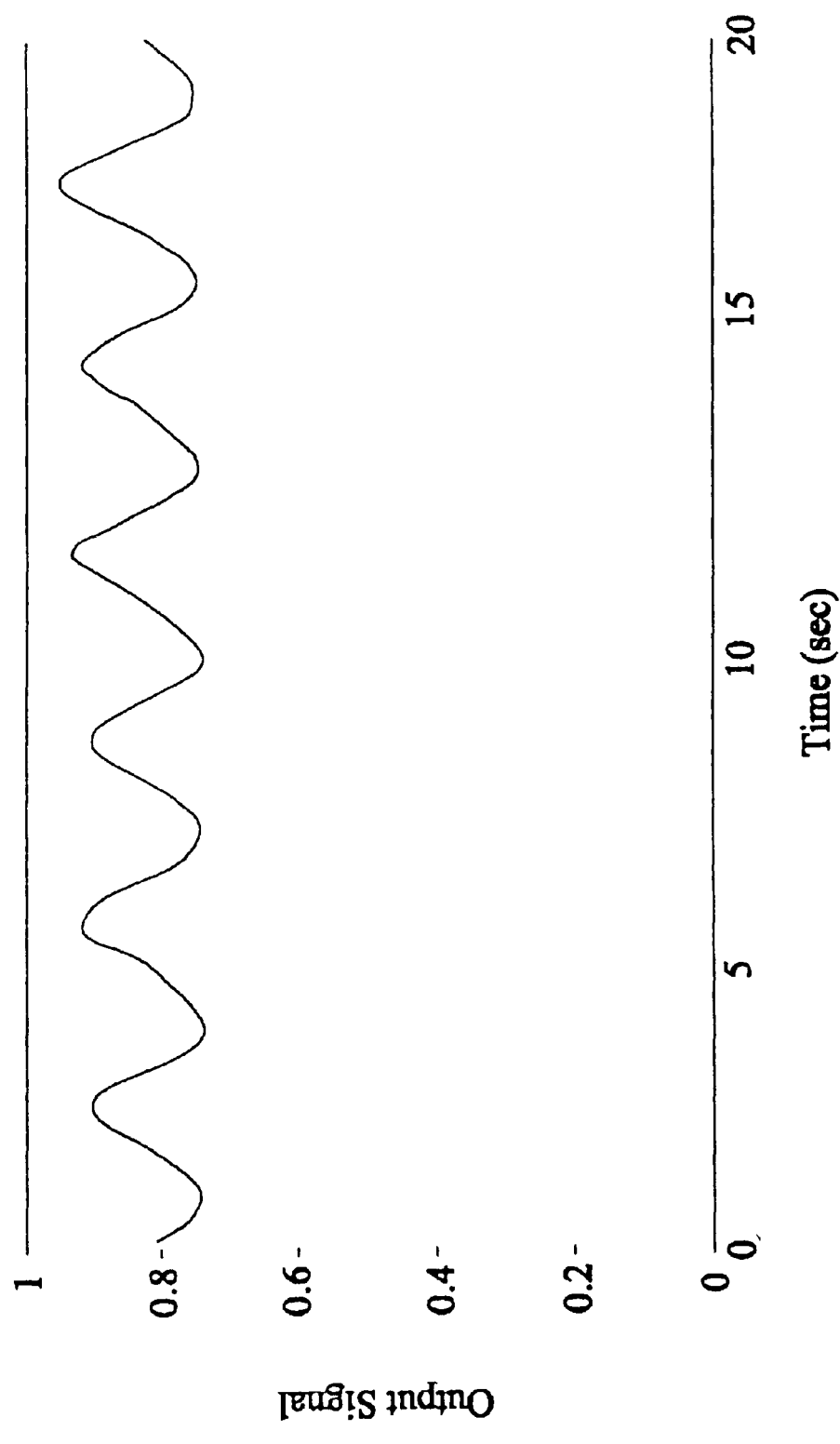
FIG. 6 shows the modulated intensity of a light.

FIG. 6 shows the modulated light intensity when an AC magnetic field is applied to the sample. Without the applied field, the light intensity is a constant. The applied filed modulates the light varying with time shown. The amplitude of the field is 13 Oe and the frequency 0.2 Hz. Gravity and other accelerations have strong effect on these diffraction rings, and the distorted rings could be used to visually display these effects for education or toys. A small magnet could also change the concentric rings to many different patterns, which in turn could be used to make toys, showing magnet induced dynamic patterns.

FIG. 7 shows a schematic for a ferrofluid cell 19/21 gyroscope shown in the apparatus of FIG. 1. A ferrofluid 20 is sandwiched between two glass plates 54 separated by a spacer 55 with the thickness of 100 um.

Figure 8:
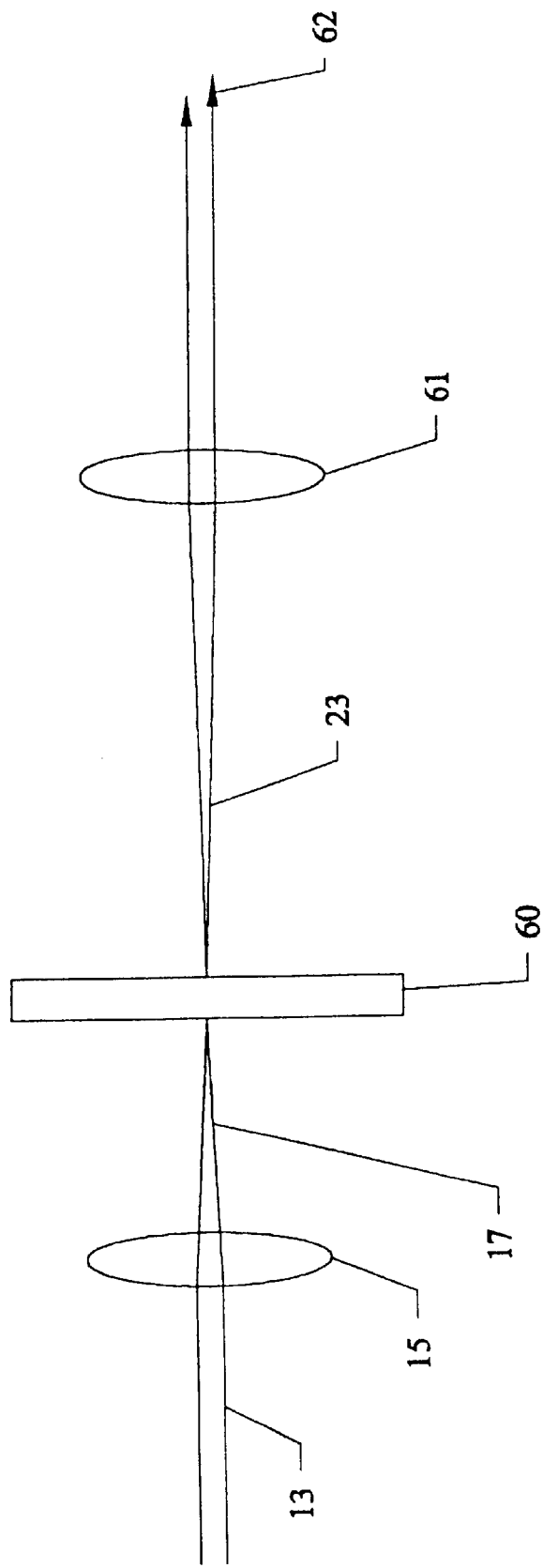
FIG. 8 shows the light modulator of FIG. 7.

FIG. 8. shows the light modulator of FIG. 7 with other optical components. The incident laser beam 13 is focused by lens 15. After passing through a light modulator, the output power of beam 23 is modulated by ac field. The beam 23 can be further collimated by lens 61 and becomes beam 62.

While the invention has been described, disclosed, illustrated and shown in various terms of certain embodiments or modifications which it has presumed in practice, the scope of the invention is not intended to be, nor should it be deemed to be, limited thereby and such other modifications or embodiments as may be suggested by the teachings herein are particularly reserved especially as they fall within the breadth and scope of the claims here appended.

We claim:

1. An apparatus for detecting acceleration, comprising:

means for emitting an optical beam; and ferrofluid for receiving the optical beam and for producing signals; and means for detecting acceleration information from the signals.

2. The apparatus of claim 1, wherein the acceleration information includes:

diffraction signals.

3. The apparatus of claim 1, wherein the means for emitting an optical beam include:

a laser beam source.

4. The apparatus of claim 1, wherein the ferrofluid includes:

kerosene.

5. The apparatus of claim 1, wherein the ferrofluid includes:

glass plates on both sides of the ferrofluid; and a spacer adjacent to edges of the glass plates for allowing the ferrofluid to be sandwiched between the glass plates.

6. A gyroscope, comprising:

means for emitting an optical beam;

ferrofluid for receiving the optical beam and for producing signals therethrough; and means for detecting gyroscope information from the signals.

7. The gyroscope of claim 6, wherein the signals include:

diffraction signals.

8. The gyroscope of claim 6, wherein the signals include:

acceleration information.

9. The apparatus of claim 6, wherein the means for emitting an optical beam include:

a laser beam source.

10. The apparatus of claim 6, wherein the ferrofluid includes:

kerosene.

11. The apparatus of claim 6, wherein the ferrofluid includes:

glass plates on both sides of the ferrofluid; and a spacer about edges of the glass plates for allowing the ferrofluid to be sandwiched between the glass plates.

12. A method for detecting information from signal patterns in ferrofluids, comprising the steps of:

emitting a first light beam;

passing the first light beam through ferrofluid to produce signals; and detecting at least one of: acceleration information and gyroscope information from the signals.

13. The method of claim 12, wherein the signals include: diffraction patterns.

14. The method of claim 12, wherein the signals include: diffraction ring patterns.

15. The method of claim 12, further comprising the step of:

modulating light passing through the ferrofluid.

16. The method of claim 15, wherein the modulating step includes a field chosen from at least one of: an electric field and a magnetic field.

* * * * *